(12) United States Patent
Hong et al.

(10) Patent No.: US 11,140,823 B2
(45) Date of Patent: Oct. 12, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 16/375,505

(22) Filed: Apr. 4, 2019

(65) Prior Publication Data
US 2019/0307067 A1 Oct. 10, 2019

Related U.S. Application Data

(60) Provisional application No. 62/653,568, filed on Apr. 6, 2018.

(30) Foreign Application Priority Data

Nov. 19, 2018 (KR) .................... 10-2018-0142917

(51) Int. Cl.
*A01D 34/82* (2006.01)
*A01D 34/00* (2006.01)
(Continued)

(52) U.S. Cl.
CPC ......... *A01D 34/828* (2013.01); *A01D 34/008* (2013.01); *A01D 34/81* (2013.01); *A01D 2101/00* (2013.01)

(58) Field of Classification Search
CPC .... A01D 34/828; A01D 34/008; A01D 34/81; A01D 2101/00
See application file for complete search history.

(56) References Cited

U.S. PATENT DOCUMENTS 2,464,912 A 3/1949 White
3,114,229 A 12/1963 Wilson
(Continued)

FOREIGN PATENT DOCUMENTS

AU 2015418271 6/2017
CN 102523841 7/2012
(Continued)

OTHER PUBLICATIONS

Korean Office Action dated May 15, 2020 issued in KR Application No. 10-2018-0123916.
(Continued)

*Primary Examiner* — Abigail A Risic
(74) *Attorney, Agent, or Firm* — Ked & Associates, LLP

(57) ABSTRACT

A lawn mower robot includes an outer cover; an inner body accommodated into the outer cover to mount a plurality of wheels for traveling on both sides thereof; a plurality of blades rotatably mounted on a bottom surface of the inner body to mow the grass; a plurality of support portions arranged to be spaced apart in front-rear and left-right directions on an upper portion of the inner body to movably support the outer cover in front-rear and left-right directions with respect to the inner body; and a plurality of injury preventing walls provided on a bottom surface of the inner body to prevent a user's hand from entering toward the plurality of blades from a lower portion of the outer cover, thereby preventing a user's hand or the like from entering the blades through a lower portion of the outer cover so as to improve safety.

20 Claims, 8 Drawing Sheets

(51) Int. Cl.
*A01D 34/81* (2006.01)
*A01D 101/00* (2006.01)

(56) References Cited

U.S. PATENT DOCUMENTS

| | | | |
|---|---|---|---|
| 4,194,345 A * | 3/1980 | Pioch | A01D 34/81 56/17.5 |
| 4,835,952 A | 6/1989 | McLane | |
| 5,259,175 A | 11/1993 | Schmidt | |
| 6,470,588 B1 | 10/2002 | Pilger | |
| 6,999,850 B2 | 2/2006 | McDonald | |
| 7,171,799 B2 | 2/2007 | Takeishi et al. | |
| 8,234,848 B2 * | 8/2012 | Messina | A01D 34/81 56/17.1 |
| 8,336,282 B2 | 12/2012 | Messina et al. | |
| 8,387,193 B2 | 3/2013 | Ziegler et al. | |
| 9,021,777 B2 * | 5/2015 | Johnson | B60L 1/003 56/320.1 |
| 9,027,189 B2 | 5/2015 | Hickenbottom et al. | |
| 9,807,930 B1 | 11/2017 | Lydon et al. | |
| 10,299,432 B1 | 5/2019 | Kelly et al. | |
| 10,375,880 B2 * | 8/2019 | Morin | B25J 5/007 |
| 10,555,457 B2 * | 2/2020 | Song | A01D 34/008 |
| 2005/0021181 A1 | 1/2005 | Kim et al. | |
| 2005/0044836 A1 | 3/2005 | Goto et al. | |
| 2012/0023880 A1 * | 2/2012 | Messina | A01D 34/81 56/10.2 E |
| 2012/0023887 A1 * | 2/2012 | Messina | B60L 50/66 56/320.1 |
| 2013/0061417 A1 * | 3/2013 | Vanderstegen-Drake | A47L 9/1409 15/319 |
| 2013/0291506 A1 | 11/2013 | Johnson et al. | |
| 2014/0216424 A1 | 8/2014 | Gartzke et al. | |
| 2015/0271991 A1 | 10/2015 | Balutis | |
| 2016/0000007 A1 | 1/2016 | Bian et al. | |
| 2016/0014956 A1 | 1/2016 | Matsumoto et al. | |
| 2016/0081526 A1 | 3/2016 | Gottinger et al. | |
| 2016/0128275 A1 | 5/2016 | Johnson | |
| 2016/0278287 A1 | 9/2016 | Kasai et al. | |
| 2016/0338262 A1 | 11/2016 | Liu et al. | |
| 2017/0181375 A1 | 6/2017 | Hashimoto et al. | |
| 2018/0116109 A1 | 5/2018 | Matsumoto | |
| 2018/0184583 A1 * | 7/2018 | Morin | A01D 34/008 |
| 2018/0184585 A1 | 7/2018 | Song et al. | |
| 2018/0199506 A1 * | 7/2018 | Ito | A01D 34/81 |
| 2018/0235146 A1 | 8/2018 | Hashimoto et al. | |
| 2018/0271014 A1 * | 9/2018 | Matsuzawa | A01D 34/008 |
| 2019/0216012 A1 | 7/2019 | Hahn et al. | |
| 2019/0223376 A1 | 7/2019 | Lee et al. | |
| 2019/0258267 A1 | 8/2019 | Hahn et al. | |
| 2019/0278269 A1 | 9/2019 | He et al. | |
| 2020/0170186 A1 | 6/2020 | Curtis | |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
Korean Notice of Allowance dated Jan. 5, 2021 issued in KR Application No. 10-2018-0121333.
European Search Report dated Dec. 17, 2019 issued in EP Application No. 19167046.2.
United States Office Action dated Mar. 4, 2021 issued in U.S. Appl. No. 16/260,865.
United States Office Action dated Mar. 4, 2021 issued in U.S. Appl. No. 16/264,494.
U.S. Appl. No. 16/260,865, filed Jan. 29, 2019.
U.S. Appl. No. 16/264,494, filed Jan. 31, 2019.
U.S. Appl. No. 16/373,050, filed Apr. 2, 2019.
U.S. Appl. No. 16/375,424, filed Apr. 4, 2019.
U.S. Appl. No. 16/375,505, filed Apr. 4, 2019.
U.S. Appl. No. 16/375,217, filed Apr. 4, 2019.
U.S. Appl. No. 16/375,294, filed Apr. 4, 2019.
U.S. Appl. No. 16/375,400, filed Apr. 4, 2019.
European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in Ep Application No. 19167046.2.

(56) References Cited

OTHER PUBLICATIONS

European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
United States Office Action dated Mar. 11, 2021 issued in U.S. Appl. No. 16/375,400.
United States Office Action dated Mar. 16, 2021 issued in U.S. Appl. No. 16/375,217.
United States Notice of Allowance dated Apr. 1, 2021 issued in U.S. Appl. No. 16/375,294.
United States Office Action dated Apr. 12, 2021 issued in U.S. Appl. No. 16/373,050.
United States Office Action dated Apr. 12, 2021 issued in U.S. Appl. No. 16/375,424.

* cited by examiner

LAWN MOWER ROBOT

CROSS-REFERENCE TO RELATED APPLICATION(S)

Pursuant to 35 U.S.C. § 119(a), this application claims the benefit of the earlier filing date and the right of priority to U.S. Provisional Application No. 62/653,568, filed on Apr. 6, 2018, and Korean Application No. 10-2018-0142917, filed on Nov. 19, 2018, whose entire disclosures are hereby incorporated by reference. This application is also related to U.S. application Ser. No. 16/373,050 filed Apr. 2, 2019, U.S. application Ser. No. 16/375,424 filed Apr. 4, 2019, U.S. application Ser. No. 16/375,217 filed Apr. 4, 2019, U.S. application Ser. No. 16/375,294 filed Apr. 4, 2019, and U.S. application Ser. No. 16/375,400 filed Apr. 4, 2019, whose entire disclosures are also hereby incorporated by reference. This application is also related to U.S. patent application Ser. No. 16/260,865 filed on Jan. 29, 2019 and U.S. patent application Ser. No. 16/264,494 filed on Jan. 31, 2019.

BACKGROUND

1. Field

The present disclosure relates to a lawn mower robot for mowing the grass with a blade rotated by a motor.

2. Background

Lawn mower is a device for cutting and trimming the grass planted in a yard at home, a playground, a golf course, or the like. In recent years, an automated robot-type lawn mower has been developed to reduce a user's labor of having to manually operate a lawn mower to mow the grass and reduce an additional cost incurred by hiring outsiders to mow the grass. A lawn mower robot may be traveled by rotating a plurality of wheels with an electric motor mounted on both front and rear sides of a robot body, and a traveling direction of the robot may be manipulated by controlling the number of revolutions of electric motor.

The patent application (KR 10-2017-0000416, filed on Jan. 2, 2017, now issued as Korean Patent No. 10-1915547) describes that a lawn mower robot may be mounted with a blade at a bottom surface of an inner body to rotate a blade using the power of the motor so as to cut the grass. However, in this lawn mower robot, although an outer cover encloses a lower portion of the inner body, there is a potential safety accident in which the user's hand or foot enters a lower portion of the inner body and the robot is injured by the blade.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
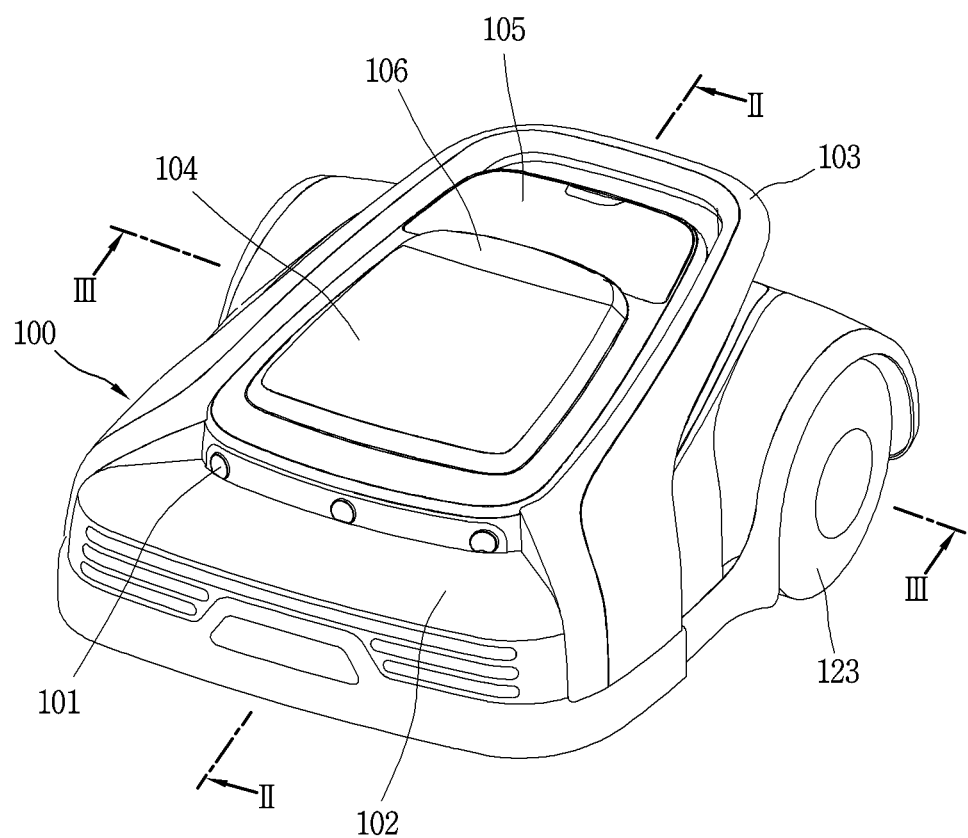
FIG. 1 is a perspective view showing an appearance of a lawn mower robot according to a first embodiment of the present disclosure.
Figure 2:
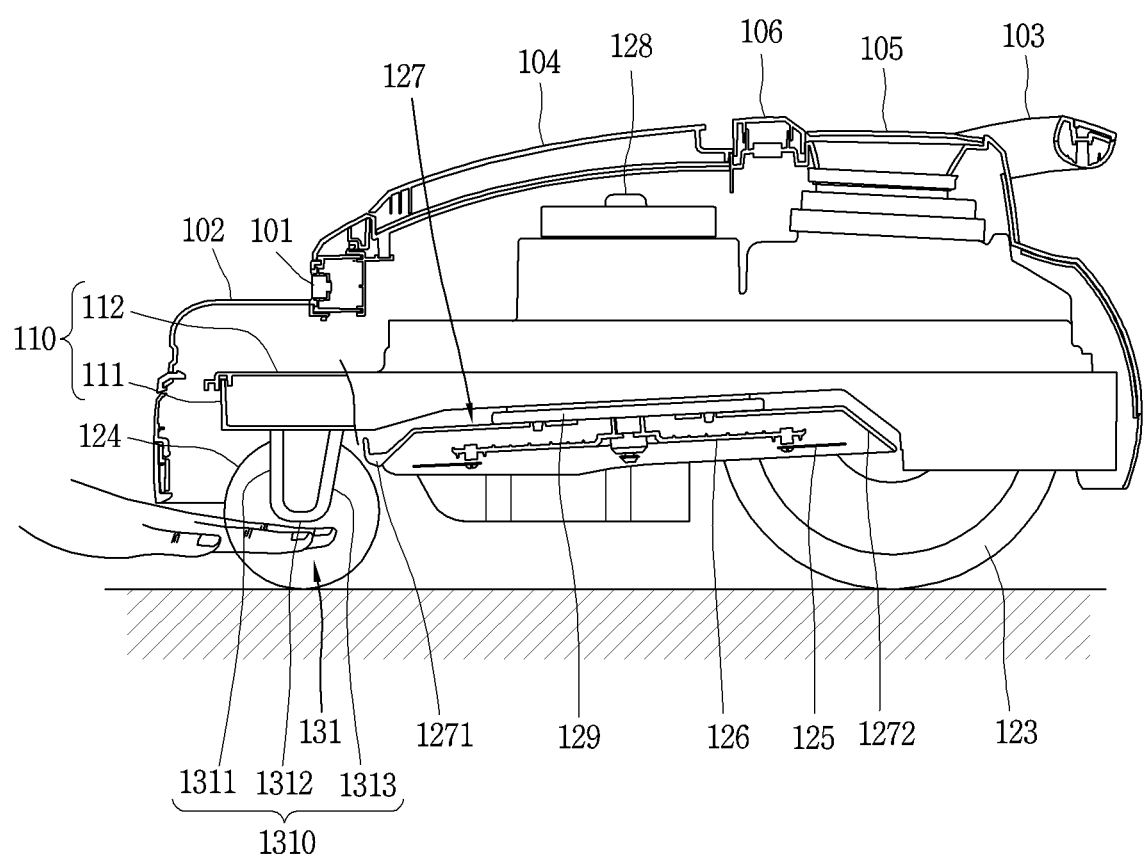
FIG. 2 is a conceptual view showing a state in which a front injury preventing wall is formed on a front bottom surface of an inner body when taken along line II-II in FIG. 1.
Figure 3:
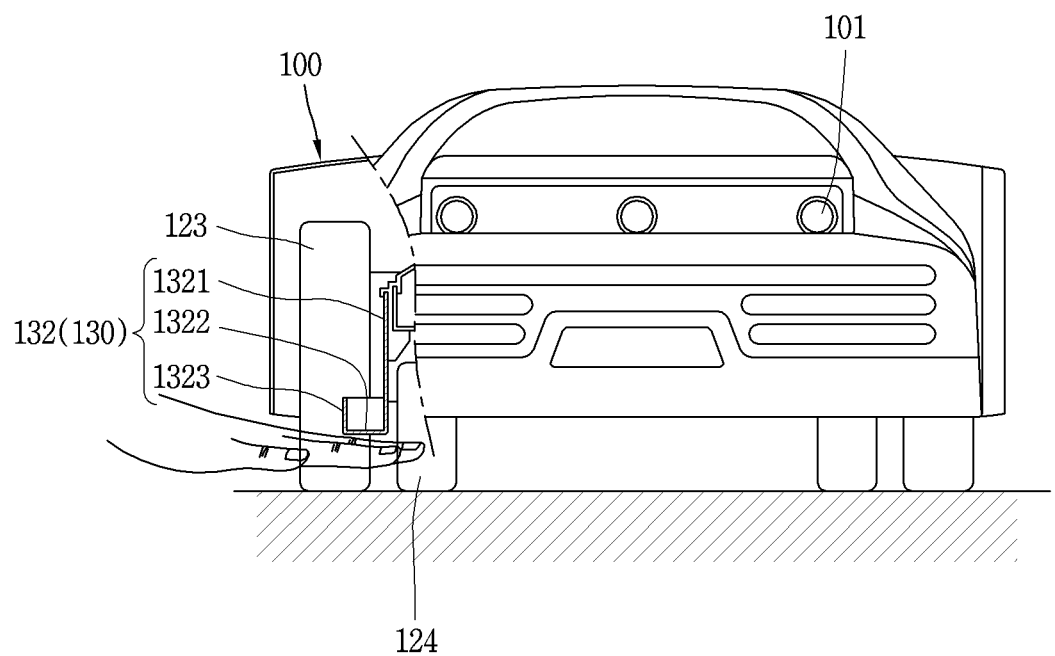
FIG. 3 is a conceptual view showing a state in which side injury preventing walls are formed on both lateral surfaces of an inner body when taken along line III-III in FIG. 1.
Figure 4:
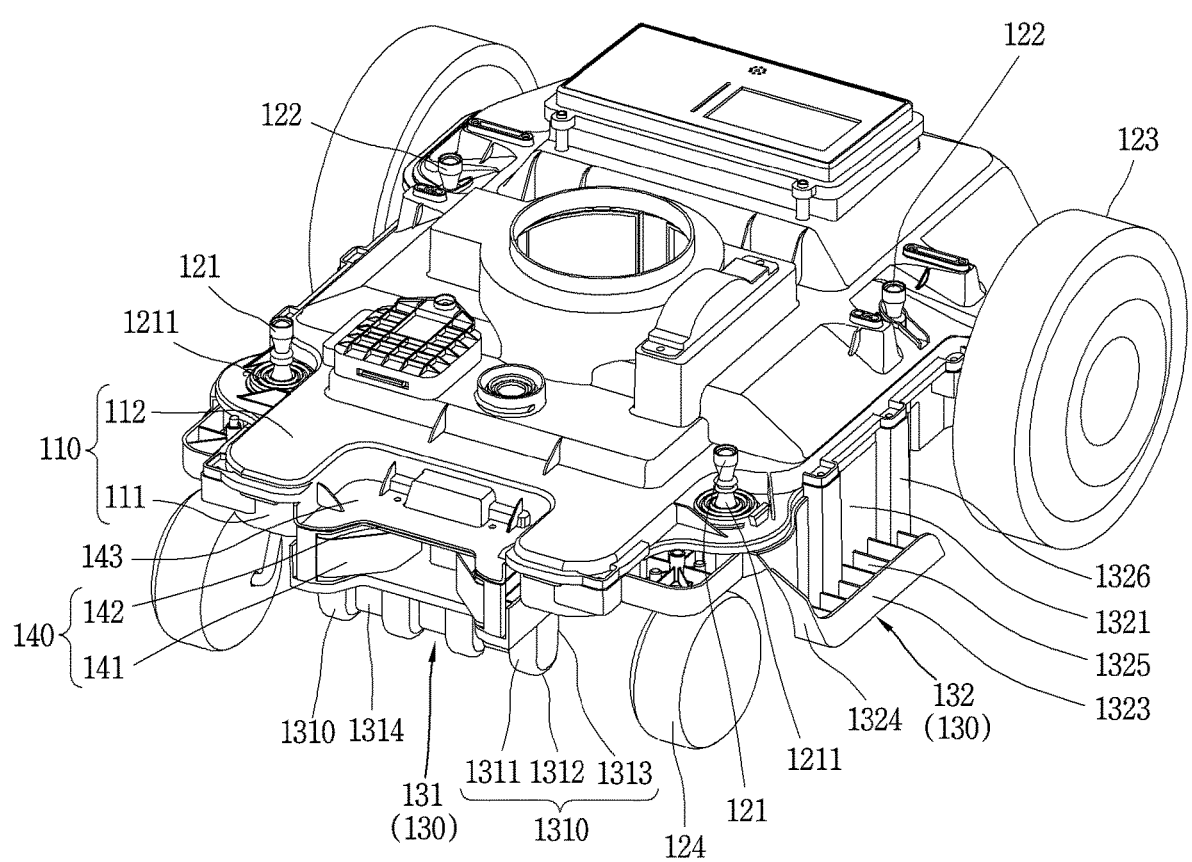
FIG. 4 is a conceptual view showing an inner body subsequent to removing an outer cover in FIG. 1.
Figure 5:
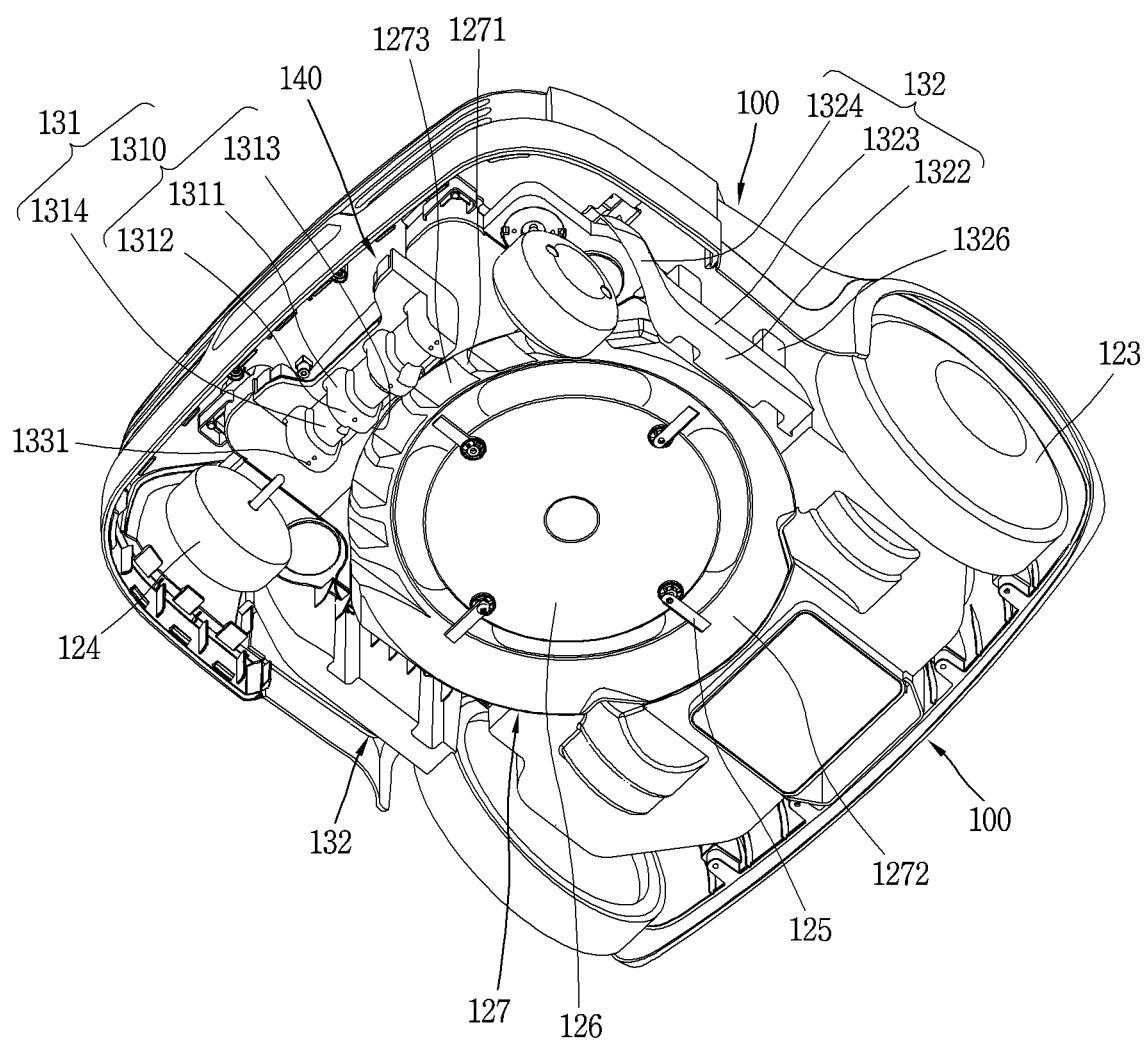
FIG. 5 is a bottom perspective view in which a lawn mower robot of FIG. 1 is seen from the bottom side.
Figure 6:
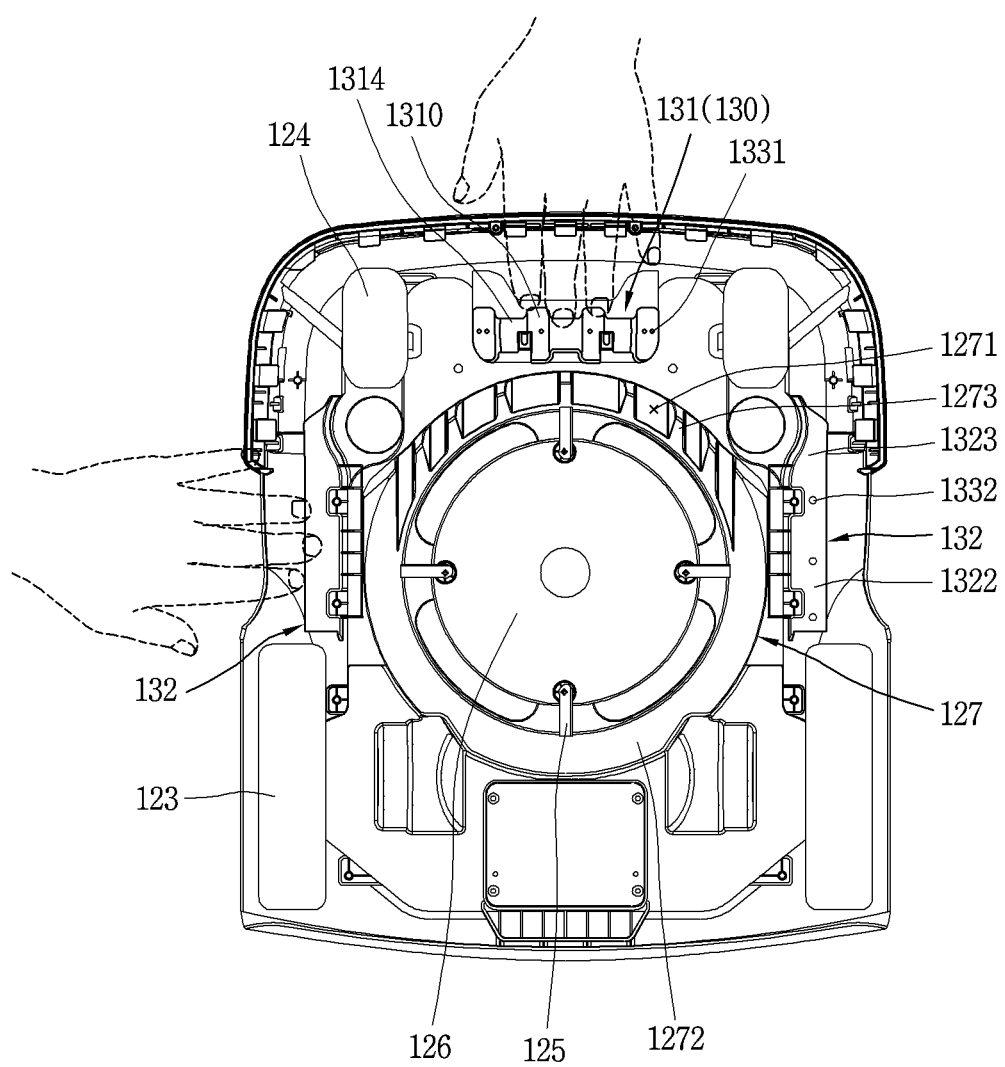
FIG. 6 is a bottom view in which a lawnmower robot of FIG. 1 is seen from the lower side.

FIG. 1 is a perspective view showing an appearance of a lawn mower robot according to a first embodiment of the present disclosure, and FIG. 2 is a conceptual view showing a state in which a front injury preventing wall is formed on a front bottom surface of an inner body (or inner frame) 110 when taken along line II-II in FIG. 1, and FIG. 3 is a conceptual view showing a state in which side injury preventing walls 130 are formed on both lateral surfaces of the inner body 110 when taken along line III-III in FIG. 1, and FIG. 4 is a conceptual view showing the inner body 110 subsequent to removing an outer cover 100 in FIG. 1, and FIG. 5 is a bottom perspective view in which a lawn mower robot of FIG. 1 is seen from the bottom side, and FIG. 6 is a bottom view in which a lawnmower robot of FIG. 1 is seen from the lower side.

The lawn mower robot of the present disclosure includes an outer cover 100 and an inner body 110. The outer cover 100 is configured to enclose the inner body 110. The inner body 110 may be accommodated into the outer cover 100. The outer cover 100 may be supported movably in front-rear and left-right directions with respect to the inner body 110 by a plurality of support portions (or support posts) 120.

The plurality of support portions 120 may be disposed to be spaced apart from each other in front, rear, left and right directions on an upper portion of the inner body 110. For example, two front support portions 121 may be spaced apart from each other in a width direction on a front side of the inner body 110, and two rear support portions 122 may be spaced apart in a width direction on a rear side of the inner body 110.

Each of the plurality of support portions 120 may be made of a rubber material. Each of the plurality of support portions 120 is formed in a cylindrical rod shape elongated in a vertical direction, and formed to have a smaller cross-sectional area from an upper end portion to a middle portion thereof or from a lower end portion to a middle portion thereof.

For each of the plurality of support portions 120, an upper end portion thereof may be fastened to the outer cover 100 and a lower end portion thereof may be fastened to the inner body 110. The front support portion 121 of the plurality of support portions 120 may have a corrugated portion 1211 extended in a bellows shape in a radial direction at a lower end portion thereof.

The front support portion 121 may elastically support the outer cover 100 so as to be movable in front, rear, left, and right directions with respect to the inner body 110 by the corrugated portion 1211. The rear support portion 122 may elastically support the outer cover 100 by bending the upper end portion in front, rear, left, and right directions about the lower end portion. When the outer cover 100 may move in front, rear, left, and right directions with respect to the inner body 110 while colliding with obstacles, thereby mitigating an impact.

A plurality of ultrasonic sensor modules 101 may be mounted on a front side of the outer cover 100. The plurality of ultrasonic sensor modules 101 may be spaced apart in a width direction. Each of the plurality of ultrasonic sensor modules 101 may transmit ultrasonic waves and receive reflection waves reflected by obstacles to sense an obstacle located in front of the ultrasonic sensor module 101.

An ultrasonic guide unit 102 may be formed in a planar shape on a front side of the outer cover 100, and the ultrasonic guide unit 102 may be extended forward from a lower portion of the plurality of ultrasonic sensor modules 101, 101, thereby limiting ultrasonic waves to be transmitted at a predetermined height or more.

A handle 103 may be provided at an upper portion of the outer cover 100 to allow the user to grip the handle 103 with his or her hand to carry the robot. The handle 103 may be composed of a front fastening portion, an intermediate inclined portion, and a rear grip portion.

The front fastening portions are respectively fastened to both front side surfaces of the outer cover 100, and the intermediate inclined portions may be extended rearward in an upwardly inclined manner from the front fastening portions. The rear grip portion, which is a portion held by the user with his or her hand, may be configured to connect a rear end portion of the intermediate inclined portion.

A first upper cover 104 and a second upper cover 105 may be mounted at an upper portion of the outer cover 100 so as to be open and closed. Each of the first upper cover 104 and the second upper cover 105 may be coupled to the inner body 110 with a hinge at a front end thereof, and thus a rear end thereof may be rotatably mounted in a vertical direction.

The first upper cover 104 may be formed in a downwardly inclined manner from a rear end thereof to a front end thereof such that the front end is located lower than the rear end in a length direction. The first upper cover 104 may be formed in a downwardly inclined manner in right and left directions from a central portion thereof such that the left and right end portions of the first upper cover 106 are located lower than the center portion.

According to such a configuration, the first upper cover 104 and the second upper cover 105 may guide rainwater to flow downward to an outer lower portion thereof without being collected in an upper portion of the outer cover 100 during raining.

A stop switch 106 may be provided in a pushable manner between the first upper cover 104 and the second upper cover 105. The stop switch 106 may be used by the user in an emergency. The stop switch 106 may be located slightly higher than the first and second upper covers 105, and configured to be located at the same position as the rear grip portion of the handle 103.

According to such a configuration, when the robot passes an obstacle such as a branch or the like at a position lower than the height of the robot, the stop switch 106 may be pushed in touch with the obstacle ahead of the rear grip portion of the handle 103 to stop the robot and prevent the handle 103 from being caught by the obstacle.

A rain sensor may be provided on one side of the upper portion of the outer cover 100 to sense rain during raining. According to such a configuration, the lawn robot may be configured to sense rain through the rain sensor and return to a charging stand.

A plurality of rain sensors may be provided. The rain sensors may be configured to sense a change in capacitance and sense an amount of rainwater by the impact and attachment of water thereto when raindrops are in contact therewith.

Wheel drive motors may be mounted on both sides of the inner body 110 to drive the robot. The wheel drive motor has a drive shaft, and a wheel 123 may be connected to the drive shaft. The plurality of wheels 123 may be rotated by receiving a rotational force from the wheel drive motor through the drive shaft.

The plurality of wheels 123 may be independently driven by the wheel drive motor. The plurality of wheel drive motors are independently connected to the plurality of wheels 123, and the number of revolutions may be controlled differently from the control unit.

A plurality of casters 124 may be orbitably mounted on a bottom surface of the inner body 110 in a left-right direction about a central shaft vertically extended.

According to such a configuration, the control unit controls the plurality of wheel drive motors to control the number of rotations of the wheels 123 differently, thereby allowing the robot to travel in a desired direction.

The lawn mower robot may have a blade assembly inside the inner body 110 to cut the grass. The blade assembly may be disposed at a central portion of the inner body 110.

The blade assembly may include a lifting frame, a plurality of blades 125, a rotating plate 126, a blade protection cover 127, a rotating cylindrical portion, a height adjusting knob 128, and the like. The blade assembly is located at a lower portion of the first upper cover 104, and when the first upper cover 104 is open, the height adjusting knob 128 of the blade assembly may be seen by the user. The user may adjust the height of the blade 125 using the height adjusting knob 128.

The lifting frame may be mounted into the inner body 110 in a vertically movable manner. The rotating plate 126 may be rotatably mounted on a bottom surface of the lifting frame. A blade drive motor may be mounted inside the lifting frame.

The plurality of blades 125 and the rotating plate 126 may be rotatably disposed on a bottom surface of the inner body 110. The rotating plate 126 may be formed in a disk shape. The blade protection cover 127 is disposed on a bottom surface of the inner body 110, and disposed to cover the rotating plate 126 and the plurality of blades 125.

A motor shaft may be configured to in a protruding manner at a lower portion of the blade drive motor, and the motor shaft may be coupled to a shaft coupling portion formed at a central portion of the rotating plate 126 to allow the rotating plate 126 to rotate by receiving power from the blade drive motor.

A plurality of blades 125 may be rotatably mounted on a bottom surface of the rotating plate 126. The plurality of blades 125 may be spaced apart in a circumferential direction of the rotating plate 126. One end portion of each of the plurality of blades 125 may be hinge-coupled to the rotating plate 126 by a fastening bolt, and the other end thereof may be folded inward or unfolded outward in a radial direction of the rotating plate 126 about the fastening bolt. According to such a configuration, the plurality of blades 125 may cut the grass while rotating together with the rotating plate 126 when the robot is traveling.

The blade protection cover 127 may be provided on a bottom surface of the lifting frame, and the blade protection cover 127 may be mounted in a vertically movable manner together with the lifting frame. The rotating plate 126 and the plurality of blades 125 may be disposed to be accommodated into the blade protection cover 127, and the rotating plate 126 may be spaced apart downward from an upper surface portion of the blade protection cover 127, and mounted rotatably with respect to the blade protection cover 127. The blade protection cover 127 has a plurality of protrusion portions 1271 and a plurality of grass inlets 1273 in front, and the plurality of protrusion portions 1271 and the plurality of grass inlets 1273 may be alternately disposed apart from each other.

The blade protection cover 127 may have inclined portions 1272 on right and left side surfaces and a rear surface thereof. The inclined portion 1272 may be extended in a downwardly inclined manner from an upper surface of the blade protection cover 127. According to such a configuration, the inclined portion 1272 and the plurality of protruding portions (or protrusion) 1271 may block stone fragments from being scattered in left-right and rearward directions and thrown out to an outside of the outer cover 100 when the blades 125 collide with stones or the like. In addition, the plurality of grass inlets 1273 may minimize resistance when the grass enters inward from a front side of the blade protection cover 127.

The plurality of blades 125, the rotating plate 126, and the blade protection cover 127 may be mounted in a vertically movable manner together with the lifting frame to adjust the height of the plurality of blades 125. In order to adjust the height of the blade 125, the height adjusting knob 128 may be rotatably mounted on an upper portion of the inner body 110. A handle portion may be formed on an upper surface of the height adjusting knob 128 and extended in a radial direction, and configured to allow the user to rotate the height adjusting knob 128 while holding the handle portion.

The rotating cylindrical portion may be coupled to a lower portion of the height adjusting knob 128, and rotatably mounted together with the height adjusting knob 128. A male screw portion may be formed on an outer circumferential surface of the rotating cylindrical portion. The rotating cylindrical portion may be accommodated into the lifting frame. A lowering limit portion may be provided at an upper end portion of the rotating cylindrical portion and rotatably mounted at an upper portion of the inner body 110.

A plurality of spiral protrusions may be formed on an inner circumferential surface of the lifting frame, and the spiral protrusions may be engaged with the male screw portions of the rotating cylindrical portion. Rotation limit portions are protruded from both sides of an outer circumferential surface of the lifting frame to only allow the lifting frame to move in a vertical direction with no rotation. According to such a configuration, the lifting frame may move in a vertical direction along the male screw portion as the rotating cylindrical portion rotates.

A blade sealing portion 129 may be disposed between a lower portion of the inner body 110 and a bottom surface of the lifting frame. An upper end portion of the blade sealing portion 129 may be fastened to a lower portion of the inner body 110, and a lower end portion of the blade sealing portion 129 may be fastened to a bottom surface of the lifting frame together with the blade protection cover 127.

A bellows-shaped corrugated portion may be extended in a length-adjustable manner in a vertical direction on a side surface of the blade sealing portion 129. According to such a configuration, the corrugated portion may be adjusted in length in a vertical direction by being unfolded or folded in a length direction, and watertightness may be maintained between a lower portion of the inner body 110 and the blade protection cover 127 even when the blade protection cover 127, the rotating plate 126, and the plurality of blades 125 move in a vertical direction together with the lifting frame, thereby preventing the blade drive motor from being damaged due to water infiltration into the inner body, for example, into the lifting frame.

The inner body 110 may include an inner body unit 111 and an inner body cover 112. A receiving space may be formed inside the inner body unit 111. The inner body cover 112 may be mounted to cover an upper portion of the inner body unit 111. A semiconductor device such as an inverter for driving a motor and electrical devices such as a PCB or the like on which the semiconductor device and the like are mounted are mounted into the inner body 110, and a wire may be configured to electrically connect various types of electrical devices.

A controller for controlling the blade drive motor 113, the wheel drive motor, and the like may be mounted inside the inner body 110. The controller may be configured to control an overall operation of the lawn mower robot. The controller may be implemented as a central processing unit (CPU) capable of processing data. Various software may be installed in the CPU.

The outer cover 100 may be configured to enclose upper, front, rear, left and right sides of the inner body 110, and the outer cover 100 and the inner body 110 may be spaced apart from each other in vertical, front-rear and left-right directions. A lower end portion of the outer cover 100 may be disposed at a predetermined height or more in an upward direction from the ground.

A plurality of injury preventing walls (or walls) 130 may be provided on the inner body 110 to prevent a user's hand or foot from entering through a gap between a lower end portion of the outer cover 100 and the ground. For each of the plurality of injury preventing walls 130, a lower end thereof may be disposed lower than that of the outer cover 100 to prevent a hand or the like from entering a bottom inner side of the inner body 110.

The plurality of injury preventing walls 130 may include a first injury preventing wall (or first wall) 131 and a second injury preventing wall (or second wall) 132. The first injury preventing wall 131 may be disposed on a front side of the inner body 110, and the second injury preventing wall 132 may be disposed on left and right sides of the inner body 110, respectively.

The first injury preventing wall 131 may be protruded downward from a front bottom side of the inner body unit 111. The first injury preventing wall 131 may be spaced rearward from a front side of the outer cover 100. The first injury preventing wall 131 may be disposed at a lower portion of a charging terminal assembly 140.

The first injury preventing wall 131 may include a plurality of protruding portions (or protrusion) 1310 and a plurality of connecting portions (or connecting extensions) 1314. The plurality of protruding portions 1310 may be spaced apart in a lateral direction (a left-right direction) on a bottom surface of the inner body unit 111. The plurality of protruding portions 1310 may be protruded downward from a bottom surface of the inner body unit 111.

Each of the plurality of protruding portions 1310 may include a front planar portion 1311, a lower curved portion 1312, and a rear planar portion 1313. The front planar portion 1311 may be disposed in parallel with a front side of the outer cover 100 and extended in a planar shape in a vertical direction.

The lower curved portion 1312 may be extended in a semicircular curved shape from a lower end of the front planar portion 1311. The rear planar portion 1313 may be extended in a tapered planar shape upward from a rear upper end of the lower curved portion. Each of the front planar portion 1311, the lower curved portion 1312, and the rear planer portion 1313 may be extended downward with a predetermined width from a bottom surface of the inner body unit 111.

The plurality of connecting portions 1314 may be configured to connect a plurality of laterally spaced protruding portions 1310. The plurality of connecting portions 1314 and the plurality of protruding portions 1310 may be alternately disposed apart from each other along a lateral direction. The plurality of connecting portions 1314 may be formed to be recessed in front-rear and upward directions with respect to the plurality of protruding portions 1310.

For example, the plurality of connecting portions 1314 may be formed in a shape corresponding to the plurality of protruding portions 1310, but the plurality of protruding portions 1310 may be formed to have a larger front-rear distance between the front planar portion 1311 and the rear planar portion 1313, and the lower curved portion 1312 may be protruded lower than the plurality of connecting portions 1314.

The plurality of protruding portions 1310 and the plurality of connecting portions 1314 may be formed to be curved along a lateral direction. A boundary portion between the protruding portion 1310 and the connection portion 1314 may be formed in a round shape with a curved surface. The plurality of protruding portions 1310 and the plurality of connecting portions 1314 may have one hollow portion as an empty space therein.

According to such a configuration, the first injury preventing wall 131 may be further protruded downward than the outer cover 100 from a bottom front side of the inner body 110 to obstruct a user's hand or the like from entering a lower inner side of the inner body not to be brought into contact with a plurality of blades at a front lower portion of the outer cover, thereby preventing a safety accident.

Furthermore, the first injury preventing wall 131 may be formed in a curved shape with a plurality of protruding portions 1310 and a plurality of connecting portions 1314 having hollow portions therein, thereby structurally maintaining rigidity as well as reducing weight. Moreover, in the first injury preventing wall 131, a lower curved portion 1312 of each of the plurality of protruding portions 1310 may be formed in a round shape with a semicircular curved surface, and thus even when the first injury preventing wall 131 is caught by an obstacle such as a flat stone, the robot may go over the obstacle by the lower curved portion 1312, thereby alleviating impact and maintaining the traveling of the robot without stopping, for example, while colliding with a low-height obstacle that is not sensed by an ultrasonic sensor.

In addition, the connecting portion 1314 between two adjacent protruding portions 1310 in a transverse direction may have a structure that is more recessed in upward and rearward directions than that of the protruding portions 1310 to minimize an entry resistance of the grass, thereby allowing the grass to smoothly enter toward an inside of the blade 125 from a front side of the outer cover 100.

The second injury preventing walls 132 may be provided at a lower portion of both left and right sides of the inner body 110, respectively. The second injury preventing wall 132 may be spaced inward from an outer side of the outer cover 100.

A lower end portion of the second injury preventing wall 132 may be disposed lower than a lateral side of the outer cover 100. The second injury preventing wall 132 may include an inner wall (or inner wall region) portion 1321, a lower wall portion (or lower wall region) 1322, an outer wall portion (or outer wall region) 1323, a forward inclined surface portion (or forward incliner surface region) 1324, and an inner rib 1325.

The inner wall portion 1321 may be extended vertically downward from both left and right sides of the inner body 110. A lower end of the inner wall portion 1321 may be extended lower than that of the outer cover 100. The inner wall portion 1321 may be extended in a front-rear direction of the inner body 110.

The lower wall portion 1322 may be extended horizontally outward in a left-right lateral direction of the inner body 110 from a lower end of the inner wall portion 1321. A lower end of the lower wall portion 1322 may be disposed lower than that of the outer cover 100.

However, the lower wall portion 1322 is not protruded out from a lateral surface of the outer cover 100. The lower wall portion 1322 may be extended in a front-rear direction of the inner body 110.

The outer wall portion 1323 may be spaced apart from the inner wall portion 1321 by a width of the lower wall portion 1322 on the outside in a left-right direction of the inner body 110. The outer wall portion 1323 may be extended upward from the lower wall portion 1322. The outer wall portion 1323 may be extended higher than a lower end of the outer cover 100. However, the outer wall portion 1323 may be disposed at a lower height than the inner wall portion 1321.

The forward inclined surface portion 1324 may be protruded downward from a bottom surface of the inner body unit 111, and extended in an inclined manner from a front side of the inner body unit 111 toward a rear side thereof. A front upper end portion of the forward inclined surface portion 1324 may be connected to a bottom front side of the inner body unit 111, and a rear lower end portion of the forward inclined surface portion 1324 may be connected to a front end of the lower wall portion 1322.

A front upper end portion of the forward inclined surface portion 1324 may be disposed in front of the rear lower end portion of the forward inclined surface portion 1324 in a length direction of the inner body 110. The forward inclined surface portion 1324 may be formed in a round shape with a curved surface having a preset curvature. A lower end portion of the forward inclined surface portion 1324 may be configured to cover a front side between a lower end portion of the inner wall portion 1321 and the outer wall portion 1323.

An upper portion between the inner wall portion 1321 and the outer wall portion 1323 may be open, and a lower portion between the inner wall portion 1321 and the outer wall portion 1323 may be configured to be blocked by the lower wall portion 1322. A front end portion between the inner wall portion 1321 and the outer wall portion 1323 may be blocked by the forward inclined surface portion 1324, and a rear end portion between the inner wall portion 1321 and the outer wall portion 1323 may be open.

A plurality of inner ribs 1325 between the inner wall portion 1321 and the outer wall portion 1323 may be extended in a left-right lateral direction (or a width direction) of the inner body 110, and connected to an inner surface of the inner wall portion 1321 and the outer wall portion 1323, respectively. The plurality of inner ribs 1325 may be extended in a height direction of the inner body 110. The plurality of inner ribs 1325 may be extended lower than the outer wall portion 1323 in height.

According to such a configuration, the second injury preventing wall 132 may be formed to protrude downward from both lower lateral sides of the inner body 110, thereby preventing a user's hand or the like from entering a bottom inner side of the inner body 110 from both lateral sides of the outer cover 100 so as not to be brought into contact with the blade 125.

Furthermore, a forward inclined surface portion 1324 of the second injury preventing wall 132 may be formed in an inclined manner such that an upper end thereof is located ahead of a lower end thereof to minimize a traveling resistance of the robot so as to allow the robot to get away without tangling and disallow a wire and the grass to be get caught in the forward inclined surface portion 1324 while traveling, thereby efficiently maintaining the traveling of the robot.

Moreover, the second injury preventing wall 132 may be formed with a double partition wall of the inner wall portion 1321 and the outer wall portion 1323, thereby withstanding an external impact in a lower inner direction of the inner body 110 on a lower lateral surface of the outer cover 100.

In addition, the inner wall portion 1321 may further include a plurality of reinforcing portions 1326. The plurality of reinforcing portions 1326 may be extended downward from a lower lateral side of the inner body unit 111. The plurality of reinforcing portions 1326 may be formed to protrude in a left-right lateral direction with respect to the inner wall portion 1321.

Each of the plurality of reinforcing portions 1326 may formed to have a U-shaped cross-sectional shape. According to such a configuration, the plurality of reinforcing portions 1326 may increase a structural rigidity of the inner wall portion 1321.

Each of the first and second injury preventing walls 131, 132 may include at least one drainage hole. The drainage hole may include a plurality of first drainage holes 1331 and a plurality of second drainage holes 1332.

The plurality of first drainage holes 1331 may be formed on a bottom surface of the protruding portion 1310 of the first injury preventing wall 131. The plurality of second drainage holes 1332 may be formed in a thickness direction through the lower wall portion 1322 of the second injury preventing wall 132.

According to such a configuration, water infiltrated into a hollow portion inside the first injury preventing wall 131 may be discharged to the outside through the first drainage hole 1331, and water infiltrated into a vacant space inside the second injury preventing wall 132 may be discharged to the outside through the second drainage hole 1332.

The first injury preventing wall 131 may be disposed at a lower portion of the charging terminal assembly 140 to complement a structural rigidity between the first injury preventing wall 131 and the charging terminal assembly 140. The charging terminal assembly 140 may include a plurality of charging terminals 141 and a charging terminal holder 142.

A charging terminal receiving portion 143 may be formed on a front inner side of the inner body 110, and configured to mount the charging terminal holder 142 therein. A plurality of charging terminals 141 may be disposed on both left and right sides of the charging terminal holder 142, and thus the charging terminals of the charging stand may be inserted into the charging terminals 141 provided in the inner body 110 to perform charging.

Figure 7:
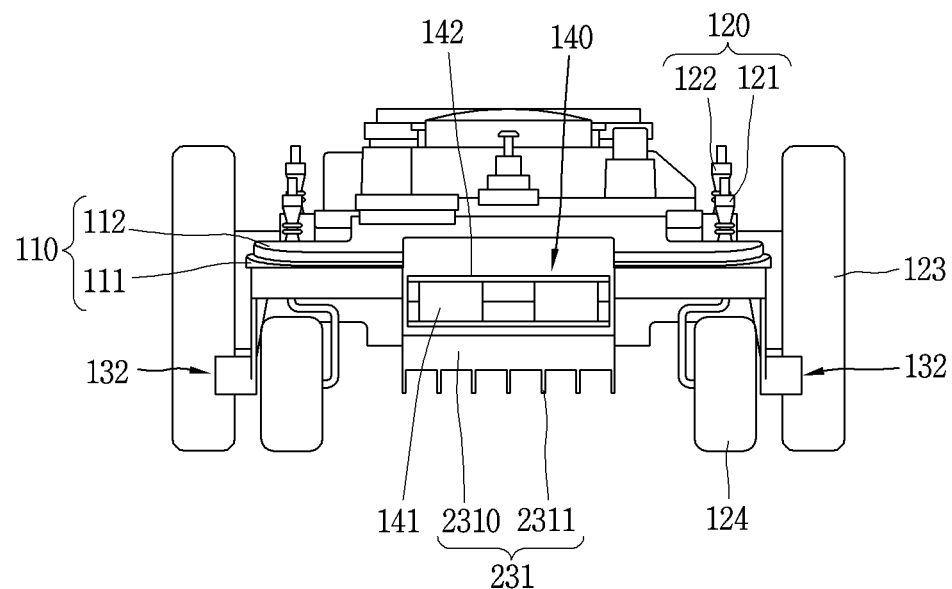
FIG. 7 is a conceptual view showing a state in which a first injury preventing wall according to a second embodiment of the present disclosure is viewed from a front side of an inner body.

FIG. 7 is a conceptual view showing a state in which the first injury preventing wall 231 according to a second embodiment of the present disclosure is viewed from a front side of an inner body 110. The first injury preventing wall 231 of the present embodiment is different from the first embodiment in terms of shape and structure, including a protruding portion (or protrusions) 2310 and a plurality of protruding ribs 2311. The other components are the same as or similar to those of the first embodiment, and thus duplicate descriptions will be omitted, and differences will be mainly described.

The protruding portion 2310 may be protruded downward from a bottom front side of the inner body unit 111. The protruding portion 2310 may be spaced rearward from a front portion of the outer cover 100 and spaced forward from a front end of the rotating plate 126.

The protruding portion 2310 may be extended in a left-right direction of the inner body 110. The protruding portion 2310 may be formed in a rectangular box shape. The protruding portion 2310 may be formed with a hollow portion therein.

The plurality of protruding ribs 2311 may be protruded downward from a bottom surface of the protruding portion 2310. The plurality of protruding ribs 2311 may be formed in a semicircular plate shape with a predetermined thickness.

The plurality of protruding ribs 2311 may be spaced apart in a length direction of the protruding portion 2310. The plurality of protruding ribs 2311 may be spaced apart in a left-right direction of the inner body 110. The protruding ribs 2311 may be extended downward in a protruding manner to be lower than a front lower end of the outer cover 100.

According to such a configuration, the plurality of protruding ribs 2311 may be protruded downward to be lower than a front lower end of the outer cover 100 at a bottom front side of the inner body 110, thereby preventing a user's hand or the like from entering the blade 125 mounted on a bottom surface of the blade 125. Furthermore, the protruding ribs 2311 may be formed in a semicircular shape to allow the robot to go over an obstacle such as a flat stone while traveling, thereby alleviating impact and maintaining the continuity of traveling.

Figure 8:
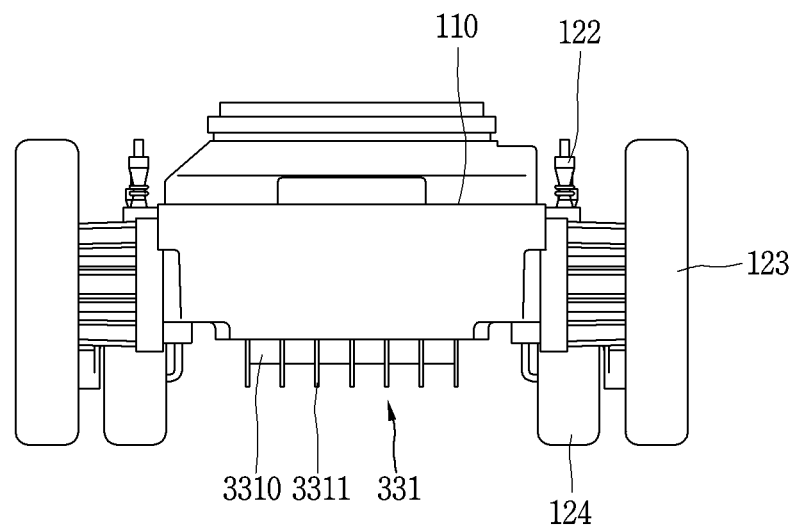
FIG. 8 is a conceptual view showing a state in which a first injury preventing wall according to a third embodiment of the present disclosure is viewed from a rear side of an inner body.

FIG. 8 is a conceptual view showing a state in which the first injury preventing wall 331 according to a third embodiment of the present disclosure is viewed from a rear side of an inner body 110. The present embodiment is different from the first and second embodiments in that it further includes the first injury preventing wall 331 on a rear bottom surface of the inner body 110. The first injury preventing wall 331 may include a protruding portion 3310 and a plurality of protruding ribs 3311.

The protruding portion 3310 and the plurality of protruding ribs 3311 may be disposed to be further spaced rearward to a rear side of the inner body 110 than a rear end portion of the rotating plate 126 or the blade protection cover 127, and spaced forward than a rear lower end portion of the outer cover 100. The protruding portion 3310 may be extended in a left-right direction from a the bottom surface of the inner body unit 111, and protruded downward from a bottom surface of the inner body unit 111.

The plurality of protruding ribs 3311 may be protruded downward from a bottom rear side of the inner body unit 111 to be lower than a rear lower end portion of the outer cover 100. Other configurations and effects are the same as or similar to those of the first and second embodiments, and thus duplicate descriptions will be omitted.

Figure 9:
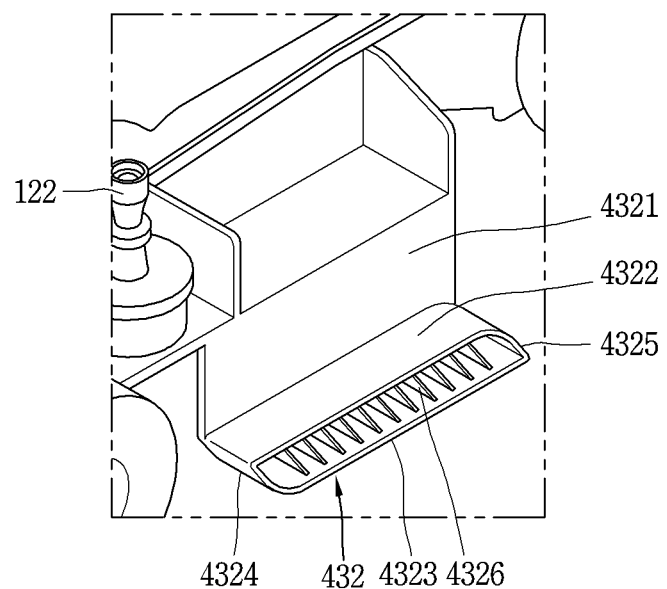
FIG. 9 is a conceptual view showing a second injury preventing wall according to a fourth embodiment of the present disclosure.

FIG. 9 is a conceptual view showing a second injury preventing wall 432 according to a fourth embodiment of the present disclosure. The second injury preventing wall 432 of the present embodiment is different from the second injury preventing wall 132 of the first embodiment in structural aspects, but is the same or similar in terms of function and effectiveness.

The second injury preventing wall 432 may include a side surface portion (or side surface region) 4321, an upper surface portion (or upper surface region) 4322, a lower surface portion (or upper surface region) 4323, a forward inclined surface portion (or forward or front inclined surface region) 4324, and a rearward inclined surface portion (or rearward or rear inclined surface region) 4325. The side surface portion 4321 may be extended to protrude downward from a lower lateral side of the inner body unit 111. A lower end of the side surface portion 4321 may be extended lower than that of the outer cover 100.

The lower surface portion 4323 may be extended horizontally outward in a left-right direction along a front-rear direction from a lower end of the side surface portion 4321. The upper surface portion 4322 may be spaced upward from the lower surface portion 4323 and extended horizontally outward in a left-right direction along a front-rear direction from the side surface portion 4321.

The upper surface portion 4322 may be disposed higher than a lower end of the outer cover 100, and the lower surface portion 4323 may be disposed lower than the lower end of the outer cover 100, thereby preventing a user's hand from entering toward a bottom inner side of the inner body 110 by being caught by the lower surface portion 4323. The upper surface portion 4322 and the lower surface portion 4323 are arranged to overlap with each other in a vertical direction with the same length, and front and rear end portions of the upper surface portion 4322 may be disposed ahead of the lower surface portion 4323 toward a front side of the inner body 110.

Each of the forward inclined surface portion 4324 and the rearward inclined surface portion 4325 may be configured to connect front and rear end portions of the upper surface portion 4322 and the lower surface portion 4323, respectively. The forward inclined surface portion 4324 and the rearward inclined surface portion 4325 may be formed such that an upper end thereof is formed in an inclined manner to be located further ahead of a lower end thereof toward a front side of the inner body 110.

An upper portion (or upper section) in a length direction of the forward inclined surface portion 4324 may be formed in an inclined manner at a predetermined inclination angle, and a lower portion (or lower section) of the forward inclined surface portion 4324 may be formed in a curved shape having a predetermined curvature. An upper portion (or upper section) of the rearward inclined surface portion 4325 in a length direction may be formed in a curved shape having a predetermined curvature, and a lower portion (or lower section) of the rearward inclined surface portion 4325 may be formed in an inclined manner at a predetermined inclination angle.

The side surface portion 4321, the upper surface portion 4322, the lower surface portion 4323, the forward inclined surface portion 4324 and the rear inclined surface portion 4325 may form an inner surface, an upper surface, a lower surface, a front surface and a rear surface of the second injury preventing wall 432, respectively. The second injury preventing wall 431 may be formed to be open in a left-right outward direction.

A vacant space may be formed inside the side surface portion 4321, the upper surface portion 4322, the lower surface portion 4323, the forward inclined surface portion 4324, and the rear inclined surface portion 4325. A plurality of intermediate ribs may be extended in an inclined manner at a preset angle with a predetermined thickness between the upper surface portion 4322 and the lower surface portion 4323.

For each of the plurality of intermediate ribs, an upper portion thereof may be arranged ahead of a lower end thereof toward a front side of the inner body 110.

According to such a configuration, a forward inclined surface portion 4324 of the second injury preventing wall 432 may be formed in an inclined manner such that an upper end thereof is located ahead of a lower end thereof to minimize a traveling resistance of the robot so as to allow the robot to get away without tangling and disallow a wire and the grass to be get caught in the forward inclined surface portion 4324 while traveling, thereby efficiently maintaining the traveling of the robot.

Moreover, for the second injury preventing wall 432, a double partition wall of the upper surface portion 4322 and the lower surface portion may be extended in a lateral direction, thereby withstanding an external impact in a lower inner direction of the inner body 110 on a lower lateral surface of the outer cover 100.

Aspects of the present disclosure provide a lawn mower robot capable of obstructing a hand or a foot from entering a lower portion of the lawn mower robot, thereby preventing an injury on the hand or the like caused by a blade. Related to this aspect of the present disclosure, a lawn mower robot according to an embodiment of the present disclosure may include an outer cover; an inner body accommodated into the outer cover to mount a plurality of wheels for traveling on both sides thereof; a plurality of blades rotatably mounted on a bottom surface of the inner body to mow the grass; a plurality of support portions arranged to be spaced apart in front-rear and left-right directions on an upper portion of the inner body to movably support the outer cover in front-rear and left-right directions with respect to the inner body; and a plurality of injury preventing walls provided on a bottom surface of the inner body to prevent a user's hand from entering toward the plurality of blades from a lower portion of the outer cover.

According to an embodiment of the present disclosure, the plurality of injury preventing walls may include a first injury preventing wall protruded downward from a bottom front side of the inner body; and a plurality of second injury preventing walls protruded downward from both bottom left and right sides of the inner body, respectively. According to an embodiment of the present disclosure, the plurality of injury preventing walls may further include a first injury preventing wall protruded downward from a bottom rear side of the inner body.

According to an embodiment of the present disclosure, the lawn mower robot may further include a charging terminal assembly mounted on a front inner side of the inner body to have a plurality of charging terminals, wherein the first injury preventing wall is disposed at a lower portion of the charging terminal assembly. According to an embodiment of the present disclosure, the first injury preventing wall may include a plurality of protruding portions protruded downward from a bottom front side of the inner body; and a plurality of connecting portions extended in a spacing direction of the plurality of protruding portions to connect the plurality of protruding portions.

According to an embodiment of the present disclosure, the plurality of protruding portions may be spaced apart in a left-right lateral direction of the inner body, and the plurality of connecting portions may be extended in a left-right lateral direction of the inner body, and the plurality of protruding portions and the plurality of connecting portions may be alternately arranged with each other.

According to an embodiment of the present disclosure, each of the plurality of protruding portions may be protruded in front-rear and downward directions with respect to the plurality of connecting portions. According to an embodiment of the present disclosure, the plurality of protruding portions may have a lower curved portion formed in a semicircular curved shape at a lower end portion thereof.

According to an embodiment of the present disclosure, the second injury preventing portion may include an inner wall portion extended downward from both left and right sides of the inner body, respectively, to be lower than a lower end of the outer cover; a lower wall portion horizontally extended from a lower end of the inner wall portion to the outside in a right-left lateral direction; an outer wall portion extended upward from the lower wall portion to be higher than a lower end of the outer cover; and a forward inclined surface portion extended in a downwardly inclined manner from a front upper end of the inner wall portion to a front end of the lower wall portion. According to an embodiment of the present disclosure, the second injury preventing wall may further include a plurality of inner ribs extended in a width direction between the inner wall portion and the outer wall portion.

According to another embodiment of the present disclosure, the second injury preventing wall may include a side surface portion extended to protrude downward from both left and right sides of the inner body, respectively; a lower surface portion horizontally extended from a lower end of the side surface portion; an upper surface portion spaced apart upward from the lower surface portion; a front inclined surface portion extended in an inclined manner to connect front end portions of the upper surface portion and the lower surface portion, respectively, such that an upper end thereof is extended in an inclined manner so as to be disposed ahead of a lower end thereof toward a front side thereof; and a rear inclined surface portion extended in an inclined manner to connect rear end portions of the upper surface portion and the lower surface portion, respectively, such that an upper end thereof is extended in an inclined manner so as to be disposed ahead of a lower end thereof toward a front side thereof.

According to another embodiment of the present disclosure, the forward inclined surface portion may have an upper portion formed in an inclined manner at a preset angle and a lower portion formed with a curved surface having a preset curvature, and the rear inclined surface portion may have an upper portion formed with a curved surface having preset curvature and a lower portion formed in an inclined manner at a preset angle.

According to another embodiment of the present disclosure, the second injury preventing wall may further include a plurality of intermediate ribs formed in an inclined manner between the upper surface portion and the lower surface portion. According to still another embodiment of the present disclosure, the first injury preventing wall may include a protruding portion protruded downward from a bottom front side of the inner body; and a plurality of protruding ribs protruded from a bottom surface of the protruding portion.

According to still another embodiment of the present disclosure, each of the plurality of protruding ribs may be formed in a semicircular plate shape. According to an embodiment of the present disclosure, each of the first injury preventing wall and the second injury preventing wall may include a plurality of drainage holes on a bottom surface thereof.

In one aspect, a plurality of injury preventing walls may be provided at a lower portion of an inner body, and a first injury preventing wall thereof may be formed in a more protruding manner downward than an outer cover on a front bottom side of the inner body to obstruct a user's hand or the like from entering a lower inner side of the inner body not to be brought into contact with a plurality of blades at a front lower portion of the outer cover, thereby preventing a safety accident.

In a second aspect, the first injury preventing wall may be formed in a curved shape with a plurality of protruding portions and a plurality of connecting portions having hollow portion therein, thereby structurally maintaining rigidity as well as reducing weight.

In a third aspect, in the first injury preventing wall, a lower curved portion of each of the plurality of protruding portions may be formed in a round shape with a semicircular curved surface, and thus even when the first injury preventing wall is caught by an obstacle such as a flat stone, the robot may go over the obstacle by a lower curved portion thereof, thereby alleviating impact and maintaining the traveling of the robot without stopping, for example, while colliding with a low-height obstacle that is not sensed by an ultrasonic sensor.

In a fourth aspect, a connecting portion between two adjacent protruding portions in a transverse direction may have a structure that is more recessed in upward and rearward directions than that of the protruding portions to minimize an entry resistance of the grass, thereby allowing the grass to smoothly enter toward an inside of the blade from a front side of the outer cover.

In a fifth aspect, the second injury preventing wall may be formed to protrude downward from a lower portion of both left and right sides of the inner body to be lower than a lateral lower end of the outer cover, thereby preventing a user's hand or the like from entering a bottom inner side of the inner body from both lateral sides of the outer cover so as not to be brought into contact with the blade.

In a sixth aspect, a forward inclined surface portion of the second injury preventing wall may be formed in an inclined manner such that an upper end thereof is located ahead of a lower end thereof to minimize a traveling resistance of the robot so as to allow the robot to get away without tangling and disallow a wire and the grass to be get caught in the forward inclined surface portion while traveling, thereby efficiently maintaining the traveling of the robot.

In a seventh aspect, the second injury preventing wall may be configured with a double wall having an inner wall portion and an outer wall portion, thereby withstanding an external impact in a lower inner direction of the inner body on a lower lateral surface of the outer cover.

In an eighth aspect, the inner wall portion may further include a plurality of reinforcing portions. The plurality of reinforcing portions may be extended downward from a lower lateral side of an inner body unit. The plurality of reinforcing portions may be formed to protrude in a left-right lateral direction with respect to the inner wall portion.

In a ninth aspect, a plurality of first drainage holes may be formed on a bottom surface of a protruding portion of the first injury preventing wall to discharge water penetrated into a hollow portion inside the first injury preventing wall to the outside through the first drainage holes, and a plurality of second drainage holes may be formed in a penetrating manner in a thickness direction on a lower surface portion of the second injury preventing wall to discharge water penetrated into a vacant space inside the second injury preventing wall to the outside through the second drainage holes.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
    an outer cover;
    an inner frame received in the outer cover, one or more wheels that provide a driving force to move the lawn mower robot being coupled to one or more sides of the inner frame;
    one or more blades that are rotatably coupled to a lower surface of the inner frame to mow grass;
    a plurality of support post positioned to be spaced apart on an upper region of the inner frame to movably support the downward outer cover with respect to the inner frame; and
    a plurality of walls extending from the inner frame, the plurality of walls being configured to prevent a user's hand from being inserted under the outer cover and into a region associated with the blades,
    wherein the plurality of walls include:
        a first wall protruded downward from a front side of the inner frame; and
        second walls protruded downward from left and right sides of the inner frame, respectively, and
    wherein each of the first wall and the second walls includes a plurality of drainage holes on a bottom surface thereof.

2. The lawn mower robot of claim 1, wherein the plurality of walls include:
    a first wall protruded downward from a rear side of the inner frame.

3. The lawn mower robot of claim 1, further comprising:
    a charging terminal assembly positioned in the front side of the inner frame and having a plurality of charging terminals,
    wherein the first wall is positioned at a lower region of the charging terminal assembly.

4. The lawn mower robot of claim 1, wherein the first wall includes:
    a plurality of protrusions extending downward from the front side of the inner frame; and a plurality of connecting extensions provided between and connecting the plurality of protrusions.

5. The lawn mower robot of claim 4, wherein the plurality of protrusions are spaced apart in a left-right lateral direction of the inner frame, the plurality of connecting extension extend in a left-right lateral direction of the inner frame, and the plurality of protrusions and the plurality of connecting extensions are positioned to alternate with each other.

6. The lawn mower robot of claim 4, wherein each of the plurality of protrusions extends in front-rear and downward directions with respect to the plurality of connecting extensions.

7. A lawn mower robot, comprising:
an outer cover;
an inner frame received in the outer cover, one or more wheels that provide a driving force to move the lawn mower robot being coupled to one or more sides of the inner frame;
one or more blades that are rotatably coupled to a lower surface of the inner frame to mow grass;
a plurality of support post positioned to be spaced apart on an upper region of the inner frame to movably support the downward outer cover with respect to the inner frame; and
a plurality of walls extending from the inner frame, the plurality of walls being configured to prevent a user's hand from being inserted under the outer cover and into a region associated with the blades,
wherein the plurality of walls include:
a first wall protruded downward from a front side of the inner frame; and
second walls protruded downward from left and right sides of the inner frame, respectively,
wherein the first wall includes:
a plurality of protrusions extending downward from the front side of the inner frame; and
a plurality of connecting extensions provided between and connecting the plurality of protrusions, and
wherein each of the plurality of protrusions has a curved section formed in a semicircular curved shape at a lower end thereof.

8. The lawn mower robot of claim 1, wherein the second walls include:
inner wall regions extended downward from the left and right sides of the inner frame, respectively, to extend lower than a lower end of the outer cover;
a lower wall region horizontally extended from a lower end of the inner wall regions to an exterior in a right-left lateral direction;
an outer wall region extended upward from the lower wall region to be higher than a lower end of the outer cover; and
a forward inclined surface region extended in a downwardly inclined direction from a front upper end of the inner wall regions to a front end of the lower wall region.

9. A lawn mower robot, comprising:
an outer cover;
an inner frame received in the outer cover, one or more wheels that provide a driving force to move the lawn mower robot being coupled to one or more sides of the inner frame;
one or more blades that are rotatably coupled to a lower surface of the inner frame to mow grass;
a plurality of support post positioned to be spaced apart on an upper region of the inner frame to movably support the downward outer cover with respect to the inner frame; and
a plurality of walls extending from the inner frame, the plurality of walls being configured to prevent a user's hand from being inserted under the outer cover and into a region associated with the blades,
wherein the plurality of walls include:
a first wall protruded downward from a front side of the inner frame; and
second walls protruded downward from left and right sides of the inner frame, respectively, and
wherein the second walls include:
inner wall regions extended downward from the left and right sides of the inner frame, respectively, to extend lower than a lower end of the outer cover;
a lower wall region horizontally extended from a lower end of the inner wall regions to an exterior in a right-left lateral direction;
an outer wall region extended upward from the lower wall region to be higher than a lower end of the outer cover;
a forward inclined surface region extended in a downwardly inclined direction from a front upper end of the inner wall regions to a front end of the lower wall region; and
a plurality of inner ribs extended in a width direction between the inner wall region and the outer wall region.

10. The lawn mower robot of claim 1, wherein the second walls include:
side surface regions that are extended to protrude downward from the left and right sides of the inner frame, respectively;
a lower surface region that is horizontally extended from a lower end of the side surface regions;
an upper surface region that is spaced apart upward from the lower surface region;
a front inclined surface region that is extended in an inclined manner to connect front end portions of the upper surface region and the lower surface region, respectively, such that the front inclined surface includes an upper end that is provided ahead of a lower end thereof toward a front side thereof; and
a rear inclined surface region that is extended in an inclined manner to connect one or more rear end portions of the upper surface region and the lower surface region, respectively, such that the rear inclined surface region includes an upper end that is provided ahead of a lower end thereof toward a front side thereof.

11. A lawn mower robot, comprising:
an outer cover;
an inner frame received in the outer cover, one or more wheels that provide a driving force to move the lawn mower robot being coupled to one or more sides of the inner frame;
one or more blades that are rotatably coupled to a lower surface of the inner frame to mow grass;
a plurality of support post positioned to be spaced apart on an upper region of the inner frame to movably support the downward outer cover with respect to the inner frame; and
a plurality of walls extending from the inner frame, the plurality of walls being configured to prevent a user's hand from being inserted under the outer cover and into a region associated with the blades, wherein the plurality of walls include:
  a first wall protruded downward from a front side of the inner frame; and
  second walls protruded downward from left and right sides of the inner frame, respectively,
wherein the second walls include:
  side surface regions that are extended to protrude downward from the left and right sides of the inner frame, respectively,
  a lower surface region that is horizontally extended from a lower end of the side surface regions;
  an upper surface region that is spaced apart upward from the lower surface region;
  a front inclined surface region that is extended in an inclined manner to connect front end portions of the upper surface region and the lower surface region, respectively, such that the front inclined surface includes an upper end that is provided ahead of a lower end thereof toward a front side thereof; and
  a rear inclined surface region that is extended in an inclined manner to connect one or more rear end portions of the upper surface region and the lower surface region, respectively, such that the rear inclined surface region includes an upper end that is provided ahead of a lower end thereof toward a front side thereof,
wherein the forward inclined surface region has an upper section formed to be inclined at a first prescribed angle and a lower section formed with a curved surface having a first prescribed curvature, and the rear inclined surface region has an upper section formed with a curved surface having a second prescribed curvature and a lower section formed to be inclined at a second prescribed angle.

12. A lawn mower robot, comprising:
an outer cover;
an inner frame received in the outer cover, one or more wheels that provide a driving force to move the lawn mower robot being coupled to one or more sides of the inner frame;
one or more blades that are rotatably coupled to a lower surface of the inner frame to mow grass;
a plurality of support post positioned to be spaced apart on an upper region of the inner frame to movably support the downward outer cover with respect to the inner frame; and
a plurality of walls extending from the inner frame, the plurality of walls being configured to prevent a user's hand from being inserted under the outer cover and into a region associated with the blades,
wherein the plurality of walls include:
  a first wall protruded downward from a front side of the inner frame; and
  second walls protruded downward from left and right sides of the inner frame, respectively,
wherein the second walls include:
  side surface regions that are extended to protrude downward from the left and right sides of the inner frame, respectively,
  a lower surface region that is horizontally extended from a lower end of the side surface regions;
  an upper surface region that is spaced apart upward from the lower surface region;
  a front inclined surface region that is extended in an inclined manner to connect front end portions of the upper surface region and the lower surface region, respectively, such that the front inclined surface includes an upper end that is provided ahead of a lower end thereof toward a front side thereof; and
  a rear inclined surface region that is extended in an inclined manner to connect one or more rear end portions of the upper surface region and the lower surface region, respectively, such that the rear inclined surface region includes an upper end that is provided ahead of a lower end thereof toward a front side thereof,
wherein the second wall further includes a plurality of intermediate ribs formed at an incline between the upper surface region and the lower surface region.

13. The lawn mower robot of claim 1, wherein the first wall incudes:
  a protrusion extending downward from a bottom of the front side of the inner frame; and
  a plurality of protruding ribs extending from a bottom surface of the protrusion.

14. A lawn mower robot, comprising:
an outer cover;
an inner frame received in the outer cover, one or more wheels that provide a driving force to move the lawn mower robot being coupled to one or more sides of the inner frame;
one or more blades that are rotatably coupled to a lower surface of the inner frame to mow grass;
a plurality of support post positioned to be spaced apart on an upper region of the inner frame to movably support the downward outer cover with respect to the inner frame; and
a plurality of walls extending from the inner frame, the plurality of walls being configured to prevent a user's hand from being inserted under the outer cover and into a region associated with the blades,
wherein the plurality of walls include:
  a first wall protruded downward from a front side of the inner frame; and
  second walls protruded downward from left and right sides of the inner frame, respectively,
wherein the first wall includes:
  a protrusion extending downward from a bottom of the front side of the inner frame; and
  a plurality of protruding ribs extending from a bottom surface of the protrusion, and
wherein each of the plurality of protruding ribs is formed in a semicircular plate shape.

15. A lawn mower robot, comprising:
an outer cover;
an inner frame received in the outer cover, one or more wheels that provide a driving force to move the lawn mower robot being coupled to one or more sides of the inner frame;
one or more blades that are rotatably mounted at a lower surface of the inner frame to mow grass; and
a plurality of walls extending downward from and around the inner frame, a region associated with the blades,
wherein the plurality of walls include:
  a first wall protruded downward from a front side of the inner frame; and
  second walls protruded downward from left and right sides of the inner frame, respectively, and
wherein the first wall and the second walls includes:
  a plurality of drainage holes on bottom surfaces thereof.

16. The lawn mower robot of claim 15, further comprising:
- a charging terminal assembly positioned within the front side of the inner frame and having a plurality of charging terminals,
- wherein the first wall is positioned at a lower region of the charging terminal assembly.

17. The lawn mower robot of claim 15, wherein the first wall includes:
- a plurality of protrusions extending downward from a bottom of the front side of the inner frame; and
- a plurality of connecting extensions provided between and connecting the plurality of protrusions.

18. The lawn mower robot of claim 15, wherein the second walls include:
- inner wall regions extended downward from the left and right sides of the inner frame, respectively, to extend lower than a bottom of the outer cover;
- a lower wall region horizontally extended from a lower end of the inner wall regions to an exterior outside in a right-left lateral direction;
- an outer wall region extended upward from the lower wall region to be higher than a lower end of the outer cover; and
- a forward inclined surface region extended in a downwardly inclined direction from a front upper end of the inner wall regions to a front end of the lower wall region.

19. The lawn mower robot of claim 9, wherein the first wall includes:
- a plurality of protrusions extending downward from the front side of the inner frame; and
- a plurality of connecting extensions provided between and connecting the plurality of protrusions.

20. The lawn mower robot of claim 15, wherein the plurality of walls include:
- a third wall protruded downward from a rear side of the inner frame.

* * * * *